US012725146B2

(12) United States Patent
Ramos

(10) Patent No.: US 12,725,146 B2
(45) Date of Patent: Sep. 1, 2026

(54) BLOCKCHAIN TOKENS AS REAL ESTATE IN AUGMENTED REALITY ECOSYSTEMS

(71) Applicant: Oracle International Corporation, Redwood Shores, CA (US)

(72) Inventor: Brian R. Ramos, Oud-Heverlee (BE)

(73) Assignee: Oracle International Corporation, Redwood Shores, CA (US)

( * ) Notice: Subject to any disclaimer, the term of this patent is extended or adjusted under 35 U.S.C. 154(b) by 348 days.

(21) Appl. No.: 18/193,362

(22) Filed: Mar. 30, 2023

(65) Prior Publication Data

US 2024/0330899 A1 Oct. 3, 2024

(51) Int. Cl.
*G06Q 20/36* (2012.01)
*G06Q 20/38* (2012.01)
*G06Q 50/16* (2024.01)

(52) U.S. Cl.
CPC ........... *G06Q 20/36* (2013.01); *G06Q 20/389* (2013.01)

(58) Field of Classification Search
CPC ....... G06Q 50/16; G06Q 20/389; G06Q 20/36
See application file for complete search history.

(56) References Cited

U.S. PATENT DOCUMENTS 11,656,835 B1 * 5/2023 Rice ...................... G06F 3/1454 345/419
11,748,830 B2 * 9/2023 Howie .................. G06Q 10/10 705/59
11,868,395 B1 * 1/2024 Bernstein .............. G06F 16/587
12,236,542 B1 * 2/2025 Huddy .................. G06T 19/006
2007/0118291 A1 * 5/2007 Carttar .................. G06Q 40/08 702/5
2012/0226889 A1 * 9/2012 Merriman ........... G06F 16/2255 711/216
2019/0108682 A1 * 4/2019 Spivack ............. G06Q 30/0277
2022/0253958 A1 * 8/2022 Grobecker ........... G06Q 20/367
2023/0267134 A1 * 8/2023 van der Heijden ..... G06F 16/26 707/703

OTHER PUBLICATIONS

Galt Project, Whitepaper, "https://github.com/galtproject/galtproject-docs/blob/master/whitepaper/en/Whitepaper.md" (Year: 2022).*

* cited by examiner

*Primary Examiner* — Jan P Mincarelli
(74) *Attorney, Agent, or Firm* — Invoke

(57) ABSTRACT

Techniques are described herein for generating, encoding, and processing blockchain tokens as real estate in an augmented or virtual reality ecosystem. In some embodiments, the techniques include an encoding schema that encodes physical location coordinates to the unique identifier of a blockchain token. For example, the location coordinates may include the latitude and longitude of a physical space on earth. Blockchain tokens that have unique token identifiers represented by encoded geospatial information are referred to herein as location-encoded blockchain tokens. By encoding the physical location coordinates of a geographic location, the token owner or renter may populate the geographic space with curated content.

20 Claims, 6 Drawing Sheets

DISPLAY
612
INPUT DEVICE
614
CURSOR CONTROL
616
MAIN MEMORY
606
ROM
608
STORAGE DEVICE
610
BUS
602
PROCESSOR
604
COMMUNICATION INTERFACE
618
600
NETWORK LINK 620
628
INTERNET
ISP
626
SERVER
630
LOCAL NETWORK
622
HOST
624

BLOCKCHAIN TOKENS AS REAL ESTATE IN AUGMENTED REALITY ECOSYSTEMS

TECHNICAL FIELD

The present disclosure relates to blockchain networks and applications. In particular, the present disclosure relates to techniques for generating, encoding, and processing non-fungible blockchain tokens in augmented reality environments.

BACKGROUND

Blockchain tokens are digital assets that are issued and transferred over a blockchain network. There are different types of blockchain tokens including fungible and nonfungible tokens (NFTs). Fungible tokens, such as cryptocurrency coins, are interchangeable and typically have the same value. In contrast, NFTs are unique and cannot be replicated or exchanged for another NFT having an identical value. NFTs may correspond to unique digital assets, such as a piece of artwork, collectible, music file, or other content item.

NFTs are built on top of blockchain technology, which provides a secure and transparent way to track the ownership and transfer of digital assets. Each NFT is represented by a unique digital signature or token identifier that is stored on the blockchain. The digital signature or token identifier provides proof of ownership and authenticity, which may be used by nodes within the blockchain to execute blockchain transactions such as identifying and transferring the NFT to another user.

NFTs are typically encoded using a standard called ERC-721, which comprises a set of rules that defines how NFTs should be created, stored, and transferred on the blockchain network. The ERC-721 standard further specifies functions and properties that NFT smart contracts should have, including the ability to create new tokens, transfer ownership, and store metadata about the token. In addition to ERC-721, there are other NFT standards, such as ERC-1155, which are associated with different specifications for defining various aspects of creating and managing NFTs on the blockchain. While each standard defines a general set of rules for encoding NFTs, the standards still provide a significant amount of flexibility for blockchain applications to implement different encoding schemas.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
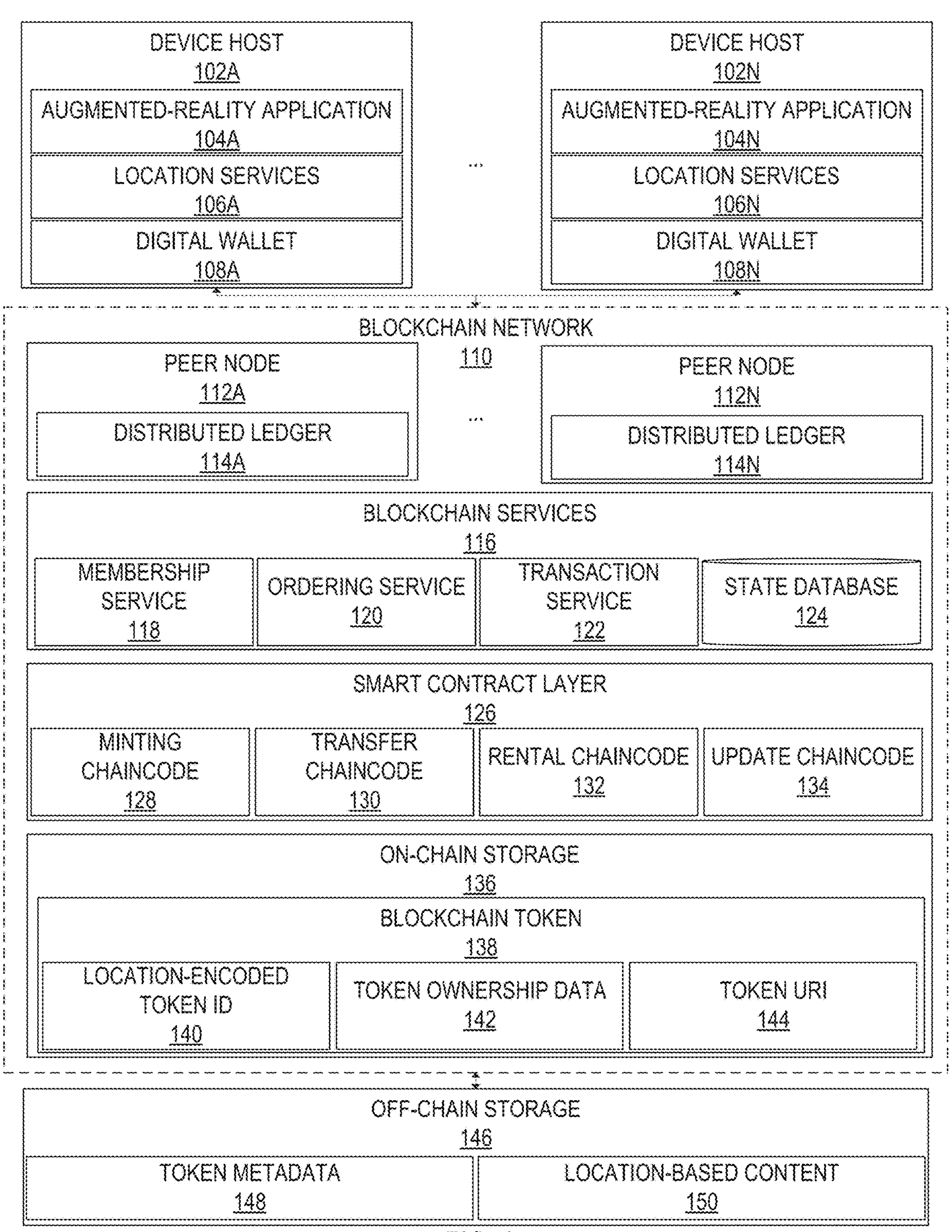
FIG. 1 illustrates an example augmented reality ecosystem with a blockchain network for managing location-encoded blockchain tokens in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview

Techniques are described herein for generating, encoding, and processing blockchain tokens as real estate in an augmented reality ecosystem. In some embodiments, the techniques include an encoding schema that encodes physical location coordinates to the unique identifier of a blockchain token. For example, the location coordinates may include the latitude and longitude of a physical space on earth. Blockchain tokens that have unique token identifiers represented by encoded geospatial information are referred to herein as location-encoded blockchain tokens. By encoding the physical location coordinates of a geographic location, the token owner or renter may populate the geographic space with curated content.

Augmented reality applications connected to the blockchain network may access the content populating a given geographic space to interact with the content. Content retrieval may be performed efficiently by converting location data into the encoded token identifier format and querying the blockchain for the curated content. For example, the application may convert a host device's global positioning system (GPS) coordinates to a location encoding, which may be used to find blockchain tokens with matching values corresponding to the location and/or token identifiers within a threshold range from the encoding. The application may then download and render the content from the identified blockchain token metadata. Thus, the blockchain transactions initiated by an application and the content retrieved from the blockchain may depend on the current location of the device hosting the client application.

Techniques are further described herein for implementing a set of protocols that govern how the location-encoded blockchain tokens are created, stored, and transferred within a blockchain network. The protocols include a minting protocol that governs the process of generating new location-encoded blockchain tokens within the blockchain network. Other protocols include a transfer protocol for transferring ownership of location-encoded blockchain tokens, an update protocol for populating location-encoded blockchain tokens with content, and a rental protocol for granting permissions to wallet addresses to maintain the token content for a finite amount of time. The protocols may enforce constraints on valid latitude and longitude integer ranges to restrict the geospatial locations and/or resolutions for which blockchain tokens may be minted, recorded, and transferred within the blockchain network.

One or more embodiments described in this Specification and/or recited in the claims may not be included in this General Overview section.

2. Blockchain System Architecture

In some embodiments, the techniques described herein are implemented by or as part of a blockchain service. A blockchain service refers to a network service, such as a platform-as-a-service (PaaS) or other cloud service, for maintaining blockchain-based distributed ledgers. A distributed ledger may include a set of blocks, linked through cryptographic values, that maintain a consensus of facts and the history of the ledger's updates. Distributed ledgers may be replicated, shared, and/or synchronized across multiple peer nodes within a blockchain network.

The techniques herein may further be implemented as a private or public blockchain. With a private or permissioned blockchain, access to a blockchain network is restricted to permitted users that have received an invitation or authorization to join the blockchain. In particular, transactions on a private blockchain are not visible to the public and may only be accessed by authorized members. The manner in which permission is granted to join a private blockchain may vary depending on the particular implementation. For example, permissions may be controlled by the founding members of the blockchain, existing members of the blockchain network may vote, a board may decide whether to grant permission, or access may be restricted/granted according to some other governance model. As another example, in an augmented reality environment, access to the blockchain network may be restricted to authorized and authenticated augmented reality applications. In a public blockchain, transactions are transparent and visible to all users on the blockchain network. Thus, private blockchains are more restrictive, offering greater control and privacy than public blockchains.

In some embodiments, the blockchain network is configured to create and manage location-encoded blockchain tokens. As previously mentioned, a location-encoded blockchain token has a unique token identifier that encodes location coordinates, such as the longitude and latitude of a physical space. A location-encoded blockchain token may be implemented as a type of nonfungible token (NFT) such that each token represents a unique digital asset corresponding to a unique geospatial location that cannot be replicated or exchanged for another token having the same encoded location value. The blockchain tokens may correspond to ERC-721 or ERC-1155 tokens with additional location-based features and constraints imposed by the blockchain network, as described further herein. However, in other embodiments, the location-encoded NFTs may conform to or be implemented independently of other existing NFT standard protocols.

FIG. 1 illustrates an example augmented reality ecosystem with a blockchain network for managing location-encoded blockchain tokens in accordance with some embodiments. As illustrated in FIG. 1, the system includes device hosts 102*a-n* and blockchain network 112. Blockchain network 110 includes peer nodes 112*a-n*, blockchain platform services 116, smart contract layer 126, on-chain storage 136, and off-chain storage 146. In one or more embodiments, the system may include more or fewer components than the components illustrated in FIG. 1. The components illustrated in FIG. 1 may be implemented in software and/or hardware. Each component may be distributed over multiple applications and/or machines. In some cases, multiple components may be combined into one application and/or machine. Operations described with respect to one component may instead be performed by another component.

Device hosts 102*a-n* are computing devices that host applications connected to blockchain network 112. In some embodiments, each device host is a digital device, which generally refers to any hardware device that includes one or more hardware processors. Examples of device hosts include computers, tablets, laptops, desktops, netbooks, servers, augmented-reality headsets, virtual reality headsets, function-specific hardware devices, hardware routers, mainframes, televisions, content receivers, set-top boxes, printers, mobile handsets, smartphones, and personal digital assistants ("PDAs").

In some embodiments, device hosts 102*a-n* execute augmented reality applications 104*a-n*. An augmented reality application may use location-based sensors of the device host to overlay or otherwise present content within a real or virtual world environment. For example, an augmented reality content viewer or browser application may display content at a device's geographic location. The content may be overlaid on a map, an image captured through the device's camera(s), or a virtually rendered environment. Other applications may present the location-based content to the user through an application page or other graphical user interface (GUI). The manner in which the content is rendered may vary depending on the application-specific logic that is accessing the location-encoded blockchain tokens.

In some embodiments, device hosts 102*a-n* execute location services 106*a-n*, which may include device sensors to track real-time location information based on the current physical location of the device. For example, location services 106*a-n* may include GPS receivers that receive location data from GPS satellites. As another example, location services 106*a-n* may include cellular signal receivers that triangulate the location of the device by pinging the location of multiple cellular towers. Additionally or alternatively, location data may be extracted using other components including Wi-Fi and/or Bluetooth receivers. Location services 106*a-n* may provide the location data to augmented reality applications 104*a-n* and/or digital wallets 108*a-n*, which may use the data to query blockchain network for digital assets populating one or more geospatial positions within a threshold range of the device.

Digital wallets 108*a-n* interact with blockchain network 110 to store, manage, and transfer digital assets, including location-encoded blockchain tokens. In some embodiments, digital wallets 108*a-n* store private keys, which may be required to access and manage location-encoded blockchain tokens. Digital wallets 108*a-n* may use the private keys to sign and verify blockchain transactions including transactions for minting a location-encoded blockchain token, transferring ownership of a token, renting the blockchain token and/or populating token metadata with content.

Blockchain network 110 is a decentralized infrastructure that provides ledger and smart contract services for blockchain-connected applications, such as augmented reality applications 104*a-n* and digital wallets 108*a-n*. Blockchain network 110 includes peer nodes 112*a-n*, which correspond to network-connected computing devices that validates and stores a copy of the blockchain's transaction data. In particular, peer nodes 112*a-n* communicate with each other to reach a consensus on the state of the blockchain. Each peer nodes 112*a-n* stores a copy of the distributed ledger (as represented by distributed ledgers 114*a-n*) and may independently verify new transactions added to blockchain network 110. Peer nodes 112*a-n* may also create transactions and propagate them to other nodes for verification and inclusion in the blockchain.

Blockchain services 116 comprises a set of nodes and/or services for managing distributed ledgers. Blockchain services 116 may be implemented by peer nodes 112*a-n* and/or other nodes within blockchain network 110. Blockchain services 116 may generally comprise membership service 118, ordering service 120, transaction service 122, and state database 124. However, as previously noted, the services that are implemented within blockchain network 110 may vary depending on the particular blockchain implementation.

Membership service 118 is configured to manage roles and access policies for members of the blockchain network according to some embodiments. For example, membership service 118 may handle adding, verifying, and canceling membership within the blockchain network. As another example, membership service 118 may define access policies for different user roles. For instance, membership service 118 may assign members to different blockchain channels, where each blockchain channel maintains an isolated distributed ledger for a corresponding subset of members of the overall blockchain. A member may be granted cryptographic keys to access the corresponding ledger and/or smart contracts that have been deployed to the blockchain channel.

In some embodiments, membership service 118 may define and enforce different access policies for founding members and participant members. For example, founding members may determine which participant members are able to join the blockchain network. When a new member is added, a digital certificate may be generated to confirm the identity of the member within the blockchain network. Founding members may be comprised of a subset of members on the blockchain network or may be third-party members that do not participate in transactions on the blockchain network.

Ordering service 120 is a component of blockchain network 110 that manages ordering of transactions in the blockchain. Transactions may be collected in a pool and then ordered and added to the blockchain in a specific order. The ordering of transactions may affect the validity and consistency of the blockchain. If transactions are added out of order, or if two conflicting transactions are added at the same time, it may cause a fork in the blockchain that leads to inconsistencies and problems within blockchain network 110. Ordering services 120 may receive transactions from various sources and order the transactions according to a predefined set of rules. The rules may account for factors such as transaction size, transaction fees, and/or other criteria determined by blockchain network 110. ordering services 120 is configured to create new blocks for transactions within blockchain network 110. Ordering service 120 may include a single ordering process or a cluster of processes. Ordering service 120 may validate proposed transactions and sequence the transaction into blocks. In a permissioned blockchain, ordering service 120 may be provided by a centralized entity, such as a consortium of participants. In a public blockchain network, ordering service 120 may be provided by a group of validators or peer nodes that work together to reach consensus on the correct order of transactions.

Transaction service 122 is configured to handle various aspects of blockchain transactions. For example, transaction service 122 may include the following features:

- Wallet management: Transaction service 122 may provide users with a digital wallet for storing blockchain tokens, cryptocurrency, and/or other digital assets and managing associated transactions with respect to the assets.
- Transaction processing: Transaction service 122 may allow users to send and receive assets on blockchain network 1110. Transaction service 122 may process these transactions and verify that the sender has satisfied a set of criteria for completing the transaction.
- Transaction tracking: Transaction service 122 may track the status of blockchain transactions and view details such as which digital assets have been transferred and rented with respect to a wallet address.
- Transaction history: Transaction service 122 may maintain a record of all the transactions a user has made on the network.
- Security: Transaction service 122 may use various security measures to protect users' assets, including encryption, multi-factor authentication, and other security protocols.

In some embodiments, transaction service 122 manages various aspects of a blockchain transaction. Each blockchain transaction may be executed through a series of steps that involve multiple nodes within the decentralized network. The stages of a blockchain transaction may include:

- Initiation: A client application initiates a transaction by creating a digital signature using a private key stored in a digital wallet. The transaction may include details such as the digital asset being requested to own or rent, the recipient's wallet address, and the cryptocurrency (or other consideration) required to complete the transaction.
- Validation: The transaction is broadcast to the blockchain network and is validated by other nodes or participants in the network. The nodes verify the transaction's authenticity and ensure that the sender has enough cryptocurrency to complete the transaction.
- Block creation: Once the transaction is verified, it is grouped with other transactions to form a block. The block contains a unique code called a "hash" that identifies the block and its contents.
- Mining: In a proof-of-work blockchain, miners may compete to solve a complex mathematical problem to add the block to the blockchain. The first miner to solve the problem may be rewarded with cryptocurrency.
- Confirmation: Once the block is added to the blockchain, it is considered confirmed, and the transaction is complete. The transaction is now recorded permanently on the blockchain, and the recipient can access the cryptocurrency that was sent to their wallet.

The transaction process outlined above may vary depending on the type of blockchain and the consensus mechanism used. For example, in a proof-of-stake blockchain, validators may be selected to validate transactions and create new blocks based on the amount of cryptocurrency each validator holds.

A successful blockchain transaction may result in blocks being added to distributed ledgers 114*a-n*. A block is a data object used to store a consensus of facts for a shared ledger. In some embodiments, each block within a blockchain includes a cryptographic hash of the previous block that links the blocks together. A block may further comprise a timestamp indicating when the block was generated, the current state of the ledger, and/or transaction data identifying the transactions (e.g., write operations) that resulted in the current state of the ledger. The cryptographic link between blocks in a blockchain enhances the tamper-proof nature of a shared ledger. When cryptographic links are used, altering the data within one block would require re-computation of the cryptographic hash value for each of the subsequent blocks in the chain. A consensus protocol among the peer nodes may prevent such tampering.

State database 124 tracks the current state of one or more distributed ledgers. State database 124 may store a record of all the transactions that have been validated and added to the blockchain, current balances, and other data associated with each account or digital wallet address on the network. State database 124 may be updated as new transactions are added to the blockchain.

In some embodiments, state database 124 is used to detect peers that are offline and update blocks to peers that are out of sync. If a peer's copy of state database 124 is not consistent, then the nodes may perform actions to reconcile the different. As previously noted, state database 124 may include state information about data being exchanged through the blockchain. For example, the state may include, but is not limited to, one or more of the following attributes:

- Data bought: Indicates whether a location-encoded blockchain token has been purchased by another member of the blockchain network.
- Data rented: Indicates whether a location-encoded blockchain token has been rented by another member of the blockchain network and the terms of the rental agreement.
- Audit state: Tracks the state of an audit of transactions associated with the data. It is noted that the above attributes may be tracked within the state database and/or distributed ledgers without storing the data payloads that are exchanged between different blockchain members. Thus, an immutable and tamper-proof record of how and when data is used may be created without compromising the privacy of the data.

Smart contract layer 124 includes self-executing digital programs that are stored within blockchain network 110. The digital programs may automatically execute transaction or other transactions based on predefined criteria and programmatic logic. For example, smart contracts, also referred to as chaincode, may be invoked by blockchain nodes to read and write application data from/to a ledger, apply validation logic and/or trigger application events. A chaincode may be installed/instantiated on one or more blockchain channels. However, the same chaincode may be run in different contexts that are specific to a channel. For example, the required endorsements to execute a smart contract may vary from one blockchain channel to another.

In some embodiments, the blockchain programs define transactional logic for various types of transactions including:

- Minting chaincode 128 implements logic for creating new location-enabled blockchain tokens on blockchain network 110. The chaincode may allow authorized users to create new location-enabled tokens based on predefined rules and conditions. For example, the rules may constrain the tokens based on a range of valid latitudinal and longitudinal values. Additionally or alternatively, the rules may constrain the tokens to recognized resolutions, which correspond to a geographic span of an individual token.
- Transfer chaincode 130 implements logic for transferring location-enabled blockchain tokens on blockchain network 110. Users may purchase location-enabled blockchain tokens by exchanging digital assets, such as cryptocurrency and/or other digital assets. The terms of the transfer may be predefined or negotiated between the owner and purchaser of the blockchain token.
- Rental chaincode 132 implements logic for renting location-enabled blockchain tokens. A rental agreement may allow the renter to populate the blockchain token's metadata with content, as discussed further herein. The rental blockchain may enforce time constraints upon the rental. After the rental time period has expired, the renter may have an option to renew or the rental agreement may be terminated. In the latter case, the content uploaded by the renter may be removed, and the renter may be blocked from performing additional updates to the token's metadata.
- Update chaincode 134 implements logic for updating location-enabled blockchain token content and/or metadata. For example, update chaincode 134 may include content filters to block obscene material from being uploaded by a renter or owner. Additionally or alternatively, update chaincode 134 may apply other filters and/or restrictions on upload requests.

In some embodiments, smart contracts may implement the set of functions defined by one or more standards. For example, a smart contract may implement the set of functions defined by the ERC-721 standard. These functions include:

- balanceOf(address owner): Returns the number of tokens owned by a specific address.
- ownerOf(uint256 tokenId): Returns the address that owns the specified token.
- approve(address to, uint256 tokenId): Grants approval to another address to transfer the specified token.
- getApproved(uint256 tokenId): Returns the address that has been approved to transfer the specified token.
- setApprovalForAll(address operator, bool approved): Grants or revokes approval for another address to transfer all tokens owned by the caller.
- isApprovedForAll(address owner, address operator): Returns whether the specified operator is approved to transfer all tokens owned by the specified owner.
- transferFrom(address from, address to, uint256 tokenId): Transfers the specified token from one address to another, if the caller is approved to do so.
- safeTransferFrom(address from, address to, uint256 tokenId): Same as transferFrom, but includes additional checks to ensure that the receiver is able to receive the token.

On-chain storage 136 includes storage of data directly on the blockchain itself, which is a decentralized and distributed ledger. In other words, it is the storage of data within the blocks of the blockchain, which are created through the consensus mechanism of the network and stored in distributed ledgers 114*a-n*. The data can include various types of information, such as transaction data, smart contract code, and blockchain tokens, including blockchain token 138. On-chain storage 136 may be more secure and immutable than off-chain storage 146 because it is distributed across the network and is protected by the consensus mechanism. However, on-chain storage 136 may also include increased transaction costs and slower transaction processing times due to mechanisms involved in storing data on the blockchain.

Blockchain token 138 is a digital asset that includes a set of fields stored in one or more blocks within distributed ledger 114*a-n*. The set of fields includes location-encoded token identifier (ID) 140, token ownership data 142, and token uniform resource identifier (URI) 144. Location-encoded token ID 140 is a unique identifier that encodes geospatial information of a unique physical location, such as a unique longitude and latitude on Earth.

Token ownership data 142 identifies the owner of blockchain token 138. For example, token ownership data 142 may include an owner identifier, the digital wallet address of the owner, and/or other owner information. Peer nodes 112*a-n* may enforce a consensus protocol that ensures that there is only one blockchain token for a given location encoding and corresponding physical location within blockchain network 110. Thus, attempts to mint blockchain tokens with the same location encoding and other attempts to replicate the token within the blockchain token may be blocked. The consensus protocol may further restrict ownership to a single digital wallet or user. In other words, the linked digital wallet may own the private key required to transfer or rent the blockchain token to other blockchain users.

Token URI 144 includes a link to token data and/or metadata stored in off-chain storage 146. For example, token URI 144 may include one or more InterPlanetary File System (IPFS) uniform resource locators (URLs), which are used to identify and locate content stored on the IPFS network. The IPFS network is a peer-to-peer distributed file system that provides a way to store and access files in a decentralized manner. IPFS URLs are used to reference content on the decentralized network based on a content identifier that is a unique hash representing the content being referenced. The content-based reference allows the URL to retrieve the content from any node on the network rather than restricting retrieval to a specific file location or directory. Thus, IPFS URLs may be used to share and distribute content in a decentralized manner, as the content is not constrained to a centralized server but may be distributed across multiple nodes.

Off-chain storage 146 stores data outside of the blockchain itself. As previously noted, off-chain storage 146 may include the IPFS network. However, off-chain storage 146 may take many forms, including centralized database, distributed file storage systems, and peer-to-peer networks. Off-chain storage 146 may be connected to blockchain network 110 through various protocols and application programming interfaces (APIs) that allow data to be securely and efficiently transferred between the two systems.

Off-chain storage 146 stores token metadata 148 and location-based content 150. Token URI 144 may provide a link (e.g., an IPFS URL) between blockchain token 138 and the token metadata stored off chain. In some embodiments, token metadata 148 includes a URL or hyperlink to location-based content 150. In other embodiments, token metadata 148 may store location-based content 150 directly. Multiple content layers may be assignable in a single metadata definition, allowing a physical space to have multi-dimensionality in the system.

Location-based content 150 represents the content stored at the geospatial location corresponding to blockchain token 138. Location-based content 150 may include multimedia content, such as audio files, image files, and/or video files. Additionally or alternatively, location-based content 150 may include other types of content, including standalone applications or applets, plug-ins, scripts, and/or other executable code. Different files may be mapped to different layers within the metadata definition. For example, one set of multimedia files may be mapped to one content layer, and another may be mapped to another layer. Each layer may be associated with a different set of dimensions, which may be used to determine which content to access and render within the augmented reality ecosystem. The content may be curated by the token owner and/or renter. As previously noted, content filters may be applied to block obscene or otherwise objectionable content from populating a geographic space.

Additional embodiments and/or examples relating to computer networks are described below in Section 5, titled Computer Networks and Cloud Networks. Additionally embodiments and/or examples relating to computing device architectures are described below in Section 6, titled Computing Device Hardware Implementations.

3. Location-Encoded Blockchain Token Management

3.1 Location-Based Encoding Schema

In some embodiments, nodes within blockchain network 110 implement an encoding schema that encodes physical location coordinates to the unique token ID of an NFT. The encoding may be based on the geographic coordinate system (GCS), which may be used to measure and identify positions directly on the Earth. The GCS position is generally encoded using longitude and latitude measurements, where latitude specifies the north-south position of a point and longitude specifies the west-east position of the point on the surface of the Earth. However, the token ID of the NFT may be generated as a function of other GCS encodings. Another example includes the Open Location Code (OLC) system where geocodes, also referred to as “plus codes”, are generated based on a set of regular grids for identifying an area on Earth. OLC codes describe an area bounded by two parallels and two meridians out of a fixed grid. The codes are generated as a function of the latitude and longitude but encode position information in a different format. Other geocode systems include the Geohash system, Mapcode, and the World Geographic Reference System (GEOREF). Examples herein are described using latitude and longitude to represent a unique point or area on Earth. However, the techniques are generally applicable to other geocode systems, including the systems listed above.

In some embodiments, a location-based encoded token ID includes the following components:

- A token type component that indicates that the token ID is for a location-encoded NFT. For example, a leading integer in the token ID may include a “1” if the token ID is location-encoded and “2” if it is not location encoded. Additional values may be used if there are more than two types of blockchain tokens in the system. If only location-encoded tokens are allowed in the system, then this component may be omitted.
- A prefix component that indicates the quadrant on Earth where the geospatial location resides. The prefix component may be assigned one of four values as indicated in Table 1 below.

TABLE 1

| Example Prefix Values and Descriptions | |
|---|---|
| Prefix Value | Description |
| 1 | Both latitude and longitude are positive |
| 2 | Latitude is negative and longitude is positive |
| 3 | Latitude is positive and longitude is negative |
| 4 | Both latitude and longitude are negative |

The values depicted above encode the negativity and positivity of the latitude and longitude values. The prefix values may vary depending on the particular implementation.

A latitude component that identifies the latitude of the geospatial location to a threshold level of decimal precision.

A longitude component that identifies the longitude of the geospatial location to a threshold level of decimal precision.

A padding component based on the remaining available bits of a token ID. For example, zero padding may be used for the remaining zero padding may be used for the remaining digits of an ERC-721 token ID field, considering the number of digits in each coordinate and the decimal precision of the coordinates.

As noted above, the latitude and longitude component may be encoded using a threshold level of decimal precision. In some embodiments, the level of precision corresponds to the resolution of a geospatial location. In particular, a higher level of precision and resolution reflects a more precise point and area on Earth. Thus, a higher level of decimal precision may correspond to a smaller geographic area covered by the blockchain token. Conversely, a lower level of resolution and decimal precision corresponds to a greater geographic area. Latitudinal and longitudinal values may be encoded up to fifteen digits of decimal precision for precise geographic coordinates. However, other levels of precision may be used (e.g., four digits of decimal precision or some other number less than fifteen) to reduce the resolution and increase the coverage area of a blockchain token. A latitudinal and longitudinal tuple at a lower level of precision may cover tuples of latitudinal and longitudinal values that, when rounded, match the value of the tuple at the lower level of precision.

With the location encoded as the blockchain token's ID, unique ownership of a physical location on Earth may be assigned to a single individual or organization with respect to blockchain network 110. The blockchain owner may have control over the token to populate the geographic space with multimedia content (e.g., via IPFS URLs). Thus, the blockchain token may serve as real estate with an augmented or virtual reality ecosystem.

In some embodiments, the encoding schema may allow for subdivisions of a blockchain token. A subdivision may be permitted in implementations where different resolutions are used to encode geospatial locations. For instance, a blockchain token ID may be encoded using two digits of decimal precision. In this case, the blockchain token spans a geographic area that covers multiple smaller geographic areas corresponding to encodings using a greater decimal precision. Multiple blockchain token IDs having a higher resolution (e.g., three or more digits of decimal precision) may be mapped to the blockchain token ID. In particular, if the higher resolution encodings round up to the lower resolution encoding, then a link may be established. The owner may subdivide the blockchain property by renting or transferring ownership of blockchain token IDs having higher resolutions within the geographic span of the lower resolution token ID. Attempts to transfer blockchain token IDs outside the area (e.g., token IDs that do not round to the latitude-longitude tuple) may be blocked.

3.2 Location-Based Constraints and Smart Contracts

In some embodiments, peer nodes 112*a-n* implement a consensus protocol for managing location-encoded blockchain tokens within blockchain network 110. The consensus protocol may define one or more location-based constraints that are enforced by peer nodes 112*a-n* when executing blockchain transactions. The location-based constraints may further be encapsulated in the smart contracts and chaincode of the self-executing digital programs that execute within blockchain network 110.

Location-based constraint may restrict the range of geocodes that may be used as token IDs. For example, the constraint may restrict encodings to valid latitudinal and longitudinal coordinates. Thus, the numbers in decimal degree format may range from −90 to 90 degrees for latitude and −180 to 180 degrees for longitude. Blockchain nodes that enforce the consensus protocol (e.g., peer nodes 112*a-n*) may prevent minting or otherwise creating blockchain tokens with token IDs that are outside the specified range.

In other embodiments, the range may be restricted to latitudinal and longitudinal coordinates for a particular geographic location. For instance, the range of values may be restricted to a particular country, state, province, county city, resort area, park, or other geographic location. As with the previous example, blockchain nodes may enforce the consensus protocol to prevent minting or otherwise creating blockchain tokens with token IDs outside of the one or more prescribed ranges.

Additionally or alternatively, constraints may restrict the resolutions that are used as encodings for blockchain token IDs. In some embodiments, the constraint may define a single level of resolution (e.g., four digits of decimal precision). In other embodiments, multiple levels of resolution may be permitted, which allows subdivisions of geospatial regions as previously discussed. Blockchain nodes may prevent minting or otherwise creating blockchain tokens with token IDs that do not satisfy the threshold level or precision and resolution prescribed by the consensus protocol.

Additionally or alternatively, other constraints may be implemented and enforced via the consensus protocol. As previously noted, the location-encoded blockchain tokens may be NFTs which cannot be replicated by other NFTs, which ensures the uniqueness and authenticity of each NFT. Thus, when a location-based NFT is minted for a particular geographic space, it is the sole, unique token mapped to the geographic space. Blockchain nodes may prevent minting or otherwise creating blockchain tokens with the same token ID that represent the same geographic space. As another example, the consensus protocol may restrict access to a token URI to device's with geographic coordinates that map whose encodings map to the token ID or are within a threshold range of the token ID. If a device host that is querying the blockchain has GPS coordinates that do not match, are outside the threshold range, or are not able to be verified, then blockchain network 110 may deny the query request and prevent access to the content populating the geographic space.

Smart contracts deployed within blockchain network 110 may encapsulate the location-based encoding schemas and constraints. For example, the self-executing digital programs may mint new location-based tokens using the encoding schema and enforcing the constraints on blockchain token IDs that may be assigned. Minted blockchain tokens may be sold, rented, or otherwise transferred between blockchain users.

Figure 2:
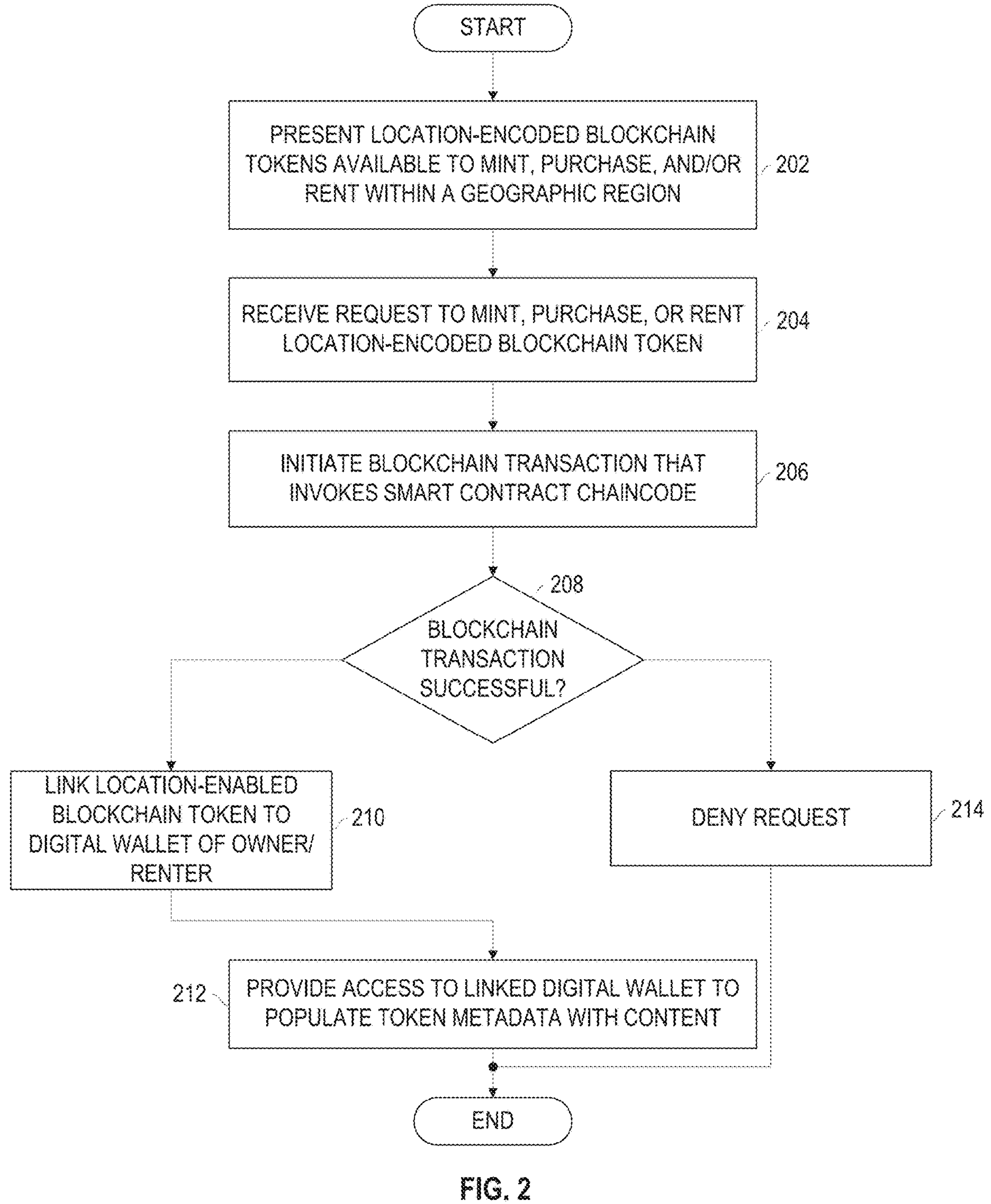
FIG. 2 illustrates an example set of operations for managing location-based blockchain tokens within a blockchain network in accordance with some embodiments.

FIG. 2 illustrates an example set of operations for managing location-based blockchain tokens within a blockchain network in accordance with some embodiments. One or more of the steps may be omitted, repeated, and/or performed in a different order. Accordingly, the specific arrangement of steps shown in FIG. 2 should not be construed as limiting the scope of the embodiments.

In some embodiments, a blockchain-connected application presents location-encoded blockchain tokens that are available to mint, purchase, and/or rent within a geographic region (operation 202). For example, the available tokens may be presented through a map interface or other graphical user interface (GUI) of the client application. The interface may allow the user to browse, filter, and query the blockchain regarding the available blockchain tokens. An example map interface is described below in Section 3.3, titled Example User Interface for Initiating Blockchain Transactions. To present the tokens, the client application may submit a query for all available blockchain tokens within a given geographic region. The query may specify the boundary of the region using latitudinal and longitudinal values, which may be converted to a range of encodings or a single encoding by the blockchain network. In other cases, the application may include the range of encodings in the query rather than generating the encoding on the backend blockchain network. One or more nodes within the blockchain network may identify which available blockchain token IDs fall within the range or, in the case of a single encoding, have a matching token ID. These token IDs may be returned to the client application, which may present the tokens to the end user (e.g., by rendering a GUI based on the returned token IDs).

In some embodiments, blockchain network 110 receives a request from the client application to mint, purchase, or rent a location-encoded blockchain token (operation 204). For example, the client may initiate the transaction request by creating a digital signature using a private key stored in a digital wallet. The request may include one or more location-encoded token IDs for the blockchain tokens that are the subject of the transaction proposal. The request may invoke the minting, transfer, or rental chaincode previously described.

Responsive to receiving the request, blockchain network 110 initiates one or more blockchain transactions (operation 206). The blockchain transaction may include peer nodes within the decentralized performing the validation, block creation, mining, and/or validation stages previously described. An example transaction flow is described in Section 3.4, titled Blockchain Transaction Flow.

In some embodiments, the process branches depending on whether the blockchain transaction was successful or not (operation 208). A blockchain transaction may fail at the validation, block creation, mining, or validation stage for a number of reasons. For example, in the context of location-encoded tokens, the blockchain transaction may fail if the location encoding is not valid or otherwise violates the location-based constraints. As another example, the blockchain transaction may fail if the transaction is attempting to mint a new location-encoded blockchain token that has previously been minted and is already owned. In other cases, a transaction may fail if the conditions for purchasing or renting a token are not satisfied.

If the blockchain token is successful, then the location-enabled blockchain token is linked to the digital wallet of the owner or renter (operation 210). In some embodiments, the link is established by writing the digital wallet address in the token ownership data field on the blockchain. Thus, the wallet address is stored in the tamper-proof distributed ledger within on-chain storage 136. In the case of rentals, there may be two digital wallet addresses associated with the same token: one corresponding to the token owner and one corresponding to the renter.

In some embodiments, the blockchain network 110 provides access to the linked digital wallet to populate the token metadata with content (operation 212). When establishing the link with the digital wallet, blockchain network 110 may provide the owner or renter with a private key that allows the owner/renter to update the token metadata, including the token URI field. For example, the owner/renter may initiate a second blockchain transaction to update the token URI with an IPFS link to off-chain multimedia content and/or off-chain token metadata. The request may be digitally signed using the private key, and one or more nodes may validate and verify the transaction based on the digital signature. If the transaction is successful, the token URI field may be updated accordingly. It is noted that when an IPFS link replaces another token URI, the previous token URI may still reside on the blockchain. However, the blockchain may include data that identifies which IPFS link is currently active. In some cases, the currently active link may be found in the most recently created block in the blockchain.

In the event that the blockchain transaction is unsuccessful, then one or more nodes in blockchain network 110 deny the request (operation 214). A request denied message may be returned to the client application, and the blockchain transaction may be aborted.

3.3 Example User Interface for Initiating Blockchain Transactions

In some embodiments, client applications that are connected to the blockchain include interfaces that allow users to initiate blockchain transactions with respect to location-encoded NFTs. For example, the interface may allow the user to search for NFTs with a particular region, filter NFTs based on specified properties, initiate purchase or rental request for an NFT, and/or mint new NFTs. The client application may connect to blockchain network 110 via one or more APIs that allow the application to query the blockchain, initiate transaction proposals, and/or invoke other services provided by blockchain network 110.

Figure 3:
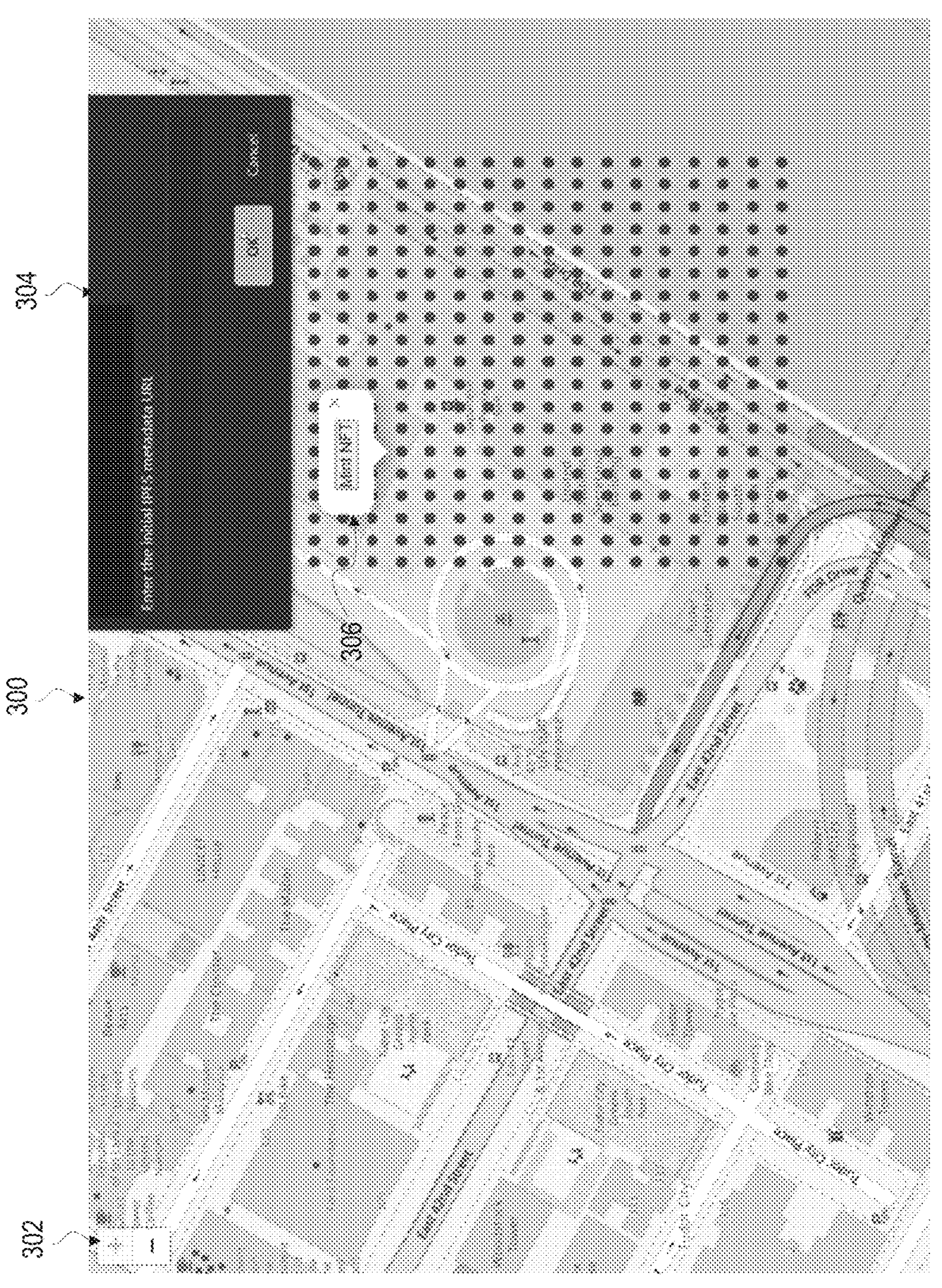
FIG. 3 illustrates an example map interface for viewing and interacting with location-based nonfungible tokens in accordance with some embodiments.

FIG. 3 illustrates an example map interface 300 for viewing and interacting with location-based NFTs in accordance with some embodiments. Map interface 300 includes zoom control 302, which allows a user to zoom in and out on the interactive map. The user may also pan the map, such as by clicking and dragging or using the arrow keys on a keyboard. Map interface 300 may further include a search bar (not shown) that allows the user to search for specific locations. For example, the user may input an address or name of a location. In response, the client application may identify a matching location and update map interface 300 to present the NFT tokens available in the geographic space.

In some embodiments, map interface 300 presents a grid of available location-based NFT tokens, which is overlaid on the map. In the example depicted in FIG. 3, each circle represents a different NFT token at a different position defined by the latitude and longitude tuple. The size of the circle may vary depending on the resolution of the NFT encoding. The present example depicts four digits of decimal precision. However, the size of the circles may increase with lower levels of precision. Additionally or alternatively, the colors of the circles may vary depending on whether the NFT tokens have been minted, purchased, and/or rented. For instance, a circle displayed in green may correspond to an NFT token that is available to mint at a given location, and a circle displayed in red may correspond to an NFT token that has already been purchased.

In some embodiments, a user may hover over or click on a location-based NFT icon to view available blockchain transactions that are available. In the example presented in Figure, dialogue 306 is displayed responsive to a user selecting an available NFT icon at a particular location. Dialogue 306 indicates that the location-based NFT is available to mint.

When the user selects the link to mint the NFT from dialogue 306, map interface 300 presents input box 304, which allows the user to input the initial IPFS metadata URL for the minted NFT token. The user may input the IPFS metadata URL and select "OK" to initiate the blockchain transaction. In response, the client application may initiate a transaction request that invokes the mint chaincode as previously described. If the transaction successfully completes, then the corresponding location is populated with the content linked to by the IPFS metadata URL.

As the user is scrolling the map, clicking on NFT icons, and/or otherwise interacting with map interface 300, the underlying application may pull the relevant NFT information by querying the blockchain using the location coordinates based on the currently displayed area. For example, the client application may determine a range of latitudinal and longitudinal values for the currently displayed area or a subset thereof. The client application may then submit a query to blockchain network 110 to pull data for all location-based blockchain tokens for locations within the specified range of latitudinal and longitudinal values. In response, blockchain network 110 may determine which NFTs have token IDs that fall within the specified ranges and return a response that includes relevant information about the tokens, such as whether the tokens are owned and/or available for rent.

In some embodiments, the application may download the multimedia content for a selected token using the IPFS URL stored in the token URI field and present the content to the user. For example, the application may present a logo or other image at a selected location, play an audio or video file, or otherwise render the associated content.

In some embodiments, owners of tokens may use map interface 300 to indicate whether a token is available to rent or not. For example, an owner may select on an NFT icon and submit input indicating rental availability and the terms for renting, such as the rent duration and required amount of cryptocurrency. In response, client application may submit the information to blockchain network 110, which may verify the owner's information and store an indication of the rental availability and information about the rental terms. When other users are browsing for token availability, map interface 300 may present the rental availability and conditions for individual NFTs based on the stored information. Users may then select NFTs of interest and initiate rental transactions as previously described.

Additionally or alternatively, owners may use map interface 300 to subdivide a given token. For example, the owner may split a token covering a large area into subplots spanning smaller areas. When the token is subdivided, a set of new NFT tokens may be minted and assigned to the owner, where the new NFT tokens have a higher level of decimal precision than the parent token. The owner may then sell or rent the smaller plots via blockchain network 110, depending on what is permitted by the consensus protocol. In other embodiments, the consensus protocol may restrict ownership of a subdivided token to a single owner but may allow rentals or the consensus protocol may not permit subdivisions at all.

In some embodiments, map interface 300 allows users to filter the location-based NFTs that are presented in a displayed area of the map. Example filter conditions may include the status of the NFT (available to mint, available to purchase from owner, available to rent from owner), the terms of a transaction proposal (purchase/rental price, rental duration), and location criteria (e.g., a threshold distance from a landmark or amenity). For instance, a user may request to view all available NFTs to rent that are within one block of a downtown location. In response, map interface 300 may present NFT icons for only the NFTs that satisfy the specified criteria. The user may then use the interface to select and initiate a blockchain transaction to rent the NFT via map interface 300. Similarly, users may use the interface to search for NFTs satisfying other criteria and/or to initiate other types of blockchain transactions including purchasing and minting new NFTs.

3.4 Blockchain Transaction Flow

In some embodiments, peer nodes may be configured to manage transactions within a blockchain, including reads and writes to shared ledgers. For example, peer nodes may endorse, validate, order and/or commit transaction records that satisfy prescribed policies defined in a consensus protocol. Transaction records may be used restrict and track exchanges of NFT tokens between blockchain members.

Figure 4:
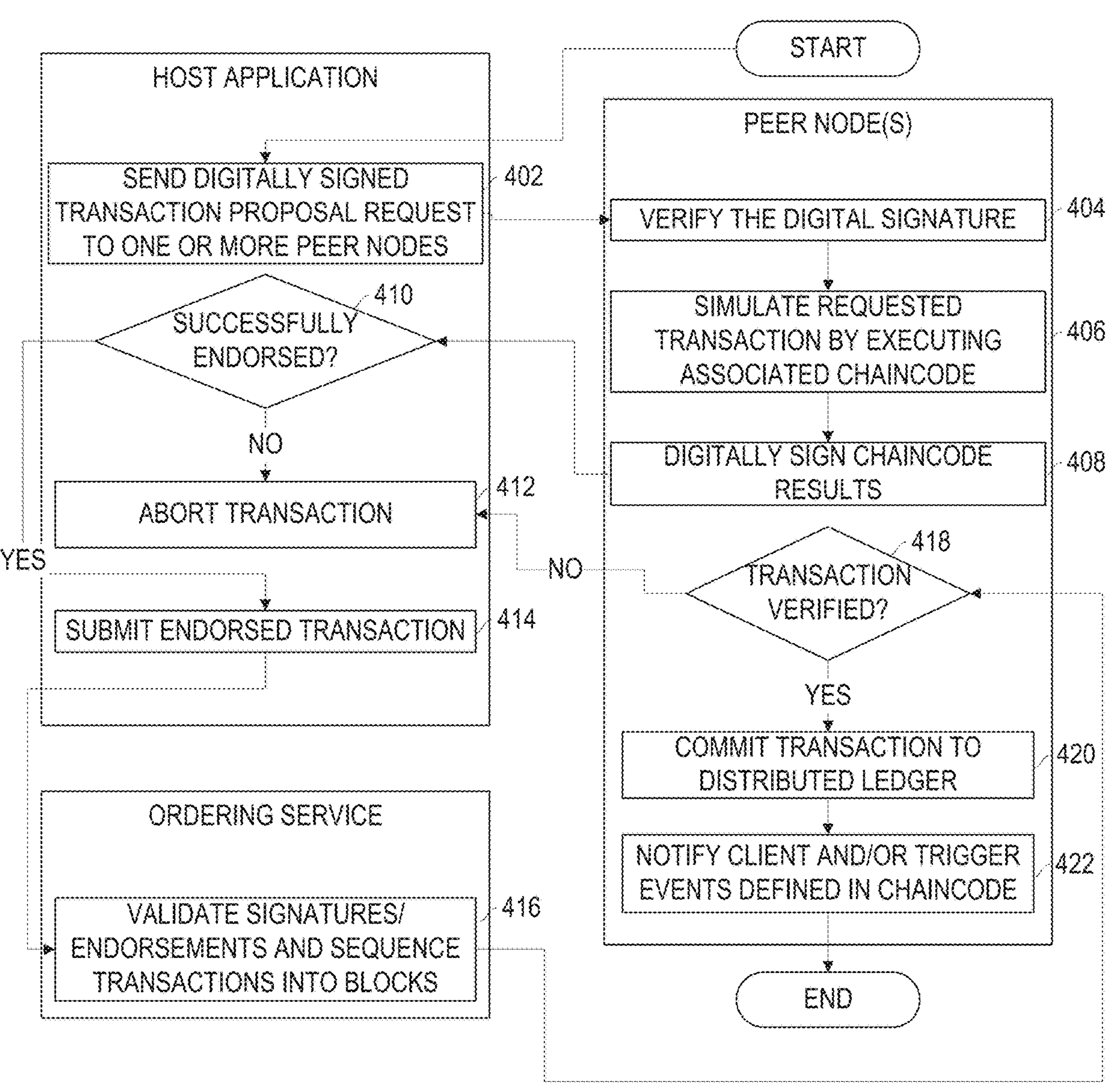
FIG. 4 illustrates an example set of operations for managing a transaction flow within a blockchain network in accordance with some embodiments.

FIG. 4 illustrates an example set of operations for managing a transaction flow within a blockchain network in accordance with some embodiments. One or more of the steps may be omitted, repeated, and/or performed in a different order. Accordingly, the specific arrangement of steps shown in FIG. 4 should not be construed as limiting the scope of the embodiments.

The transaction flow includes sending, by a host application (e.g., augmented reality applications 104*a-n*) a digitally signed transaction proposal request to one or more peer nodes within blockchain network 110 (operation 402). For example, the transaction proposal may be a request to mint, purchase, sell, or rent a location-based NFT token.

One or more of peer nodes 112*a-n* receives the transaction proposal and verifies the digital signature (operation 404). In some embodiments, a digital signature is verified using a public-private key pairing. For instance, the host application may use a private key stored in a digital wallet to digitally sign the request, which may be verified by the peer nodes 112*a-n* using a public key that pairs with the private key. If the signature is unable to be verified then the transaction may be aborted.

Once verified, the one or more peer nodes simulate the requested transaction by executing the requested chaincode (operation 406). In some embodiments, simulating the transaction includes generating a chaincode result (e.g., a read-write set for a distributed ledger). The result is not committed to the ledger at this time.

The one or more peer nodes next digitally sign the chaincode results and return the results to the host application (operation 408). Each peer node may use a private key to digitally sign the chaincode results.

The host application receives the results from the one or more endorsing peer nodes and determines whether the proposed transaction was successfully endorsed (operation 410). In some embodiments, this operation includes verifying the signatures of each endorsing peer, checking to see if the results from different peers match, and verifying the endorsement policy requirements established for the chaincode (or chaincode channel) have been satisfied. For example, the operation may verify that the conditions for minting, purchasing, or renting an NFT have been satisfied.

If the transaction was not successfully endorsed (e.g., the endorsement policy requirements were not met), then the transaction is aborted (operation 412).

Otherwise, the host application submits the endorsed transaction to ordering service 120 to proceed with committing the proposed transaction (operation 414). In some embodiments, the submitted transaction includes the results (e.g., the read-write sets) and signatures from each endorsing peer.

Ordering service 120 validates the signatures/endorsements submitted by the host application and sequences the submitted transactions into blocks (operation 416). The manner in which blocks are ordered may vary from implementation to implementation (e.g., ordering may be based on timestamps, transaction size, byzantine fault tolerance, etc.).

Ordering service 120 next submits the new blocks to one or more of peer nodes 110*a-n* to commit the transaction (operation 418). The committing peers may be the same or a different set of peer nodes than the endorsing peers.

The committing peers determine whether the transaction is verified (operation 420). In some embodiments, each committing peer validates the signatures, determines whether the endorsement policy is satisfied, and compares the values of keys/variables read at endorsement time with the current values for changes.

If the transaction cannot be verified (e.g., invalid signature, endorsement, or change in key values), then the transaction is aborted (operation 412).

Otherwise, the transaction is committed to the distributed ledger (operation 422). The updated ledger may be replicated across all members of the blockchain channel. It is noted that invalid/aborted transactions may still be written to a ledger; however a commit flag for the transaction may be used to indicate that the transaction committed or failed.

4. Location-Based Blockchain Token Retrieval and Augmented-Reality Applications Encoding location data as a blockchain token's ID allows for quick and efficient location-based retrieval of blockchain tokens that represent a physical location. To retrieve a blockchain token for a given location, the blockchain does not need to access the location data of every blockchain token in the blockchain and compare the value of a location field to the location in a query. Rather, the search may be restricted to blockchain tokens with a matching blockchain token ID. The token IDs also allow for efficient location-based retrieval of tokens that fall within a geographic area as the determination may be made based on the values of the token ID itself.

The location-based retrieval techniques of NFTs may be integrated into augmented and/or virtual reality application. An augmented reality (AR) application is a type of software application that uses technology to overlay digital content, such as 3D models, videos, and images, onto the real world. AR applications may use a camera and sensors, such as GPS and accelerometers, to track the user's location and movements, and then project the digital content onto the user's view of the real world. A virtual reality (VR) application may operate similarly, albeit the content is projected into a user's view of a virtual world rather than the real world.

AR and VR applications may be used for a wide variety of purposes, such as gaming, education, marketing, and healthcare. For example, an AR game may overlay virtual objects onto the real world, allowing users to interact with them in a more immersive way. An AR or VR educational application may allow students to explore historical sites or scientific phenomena in a more engaging and interactive way. An AR or VR marketing application may allow customers to try on virtual clothing or view digital logos mapped to a particular location. As another example, an AR or VR application may play music or audio content when the user nears a particular location. Thus, AR and VR applications may merge the curated digital content linked through the blockchain with the physical world and/or a virtual world, providing users with a richer and more engaging experience.

Figure 5:
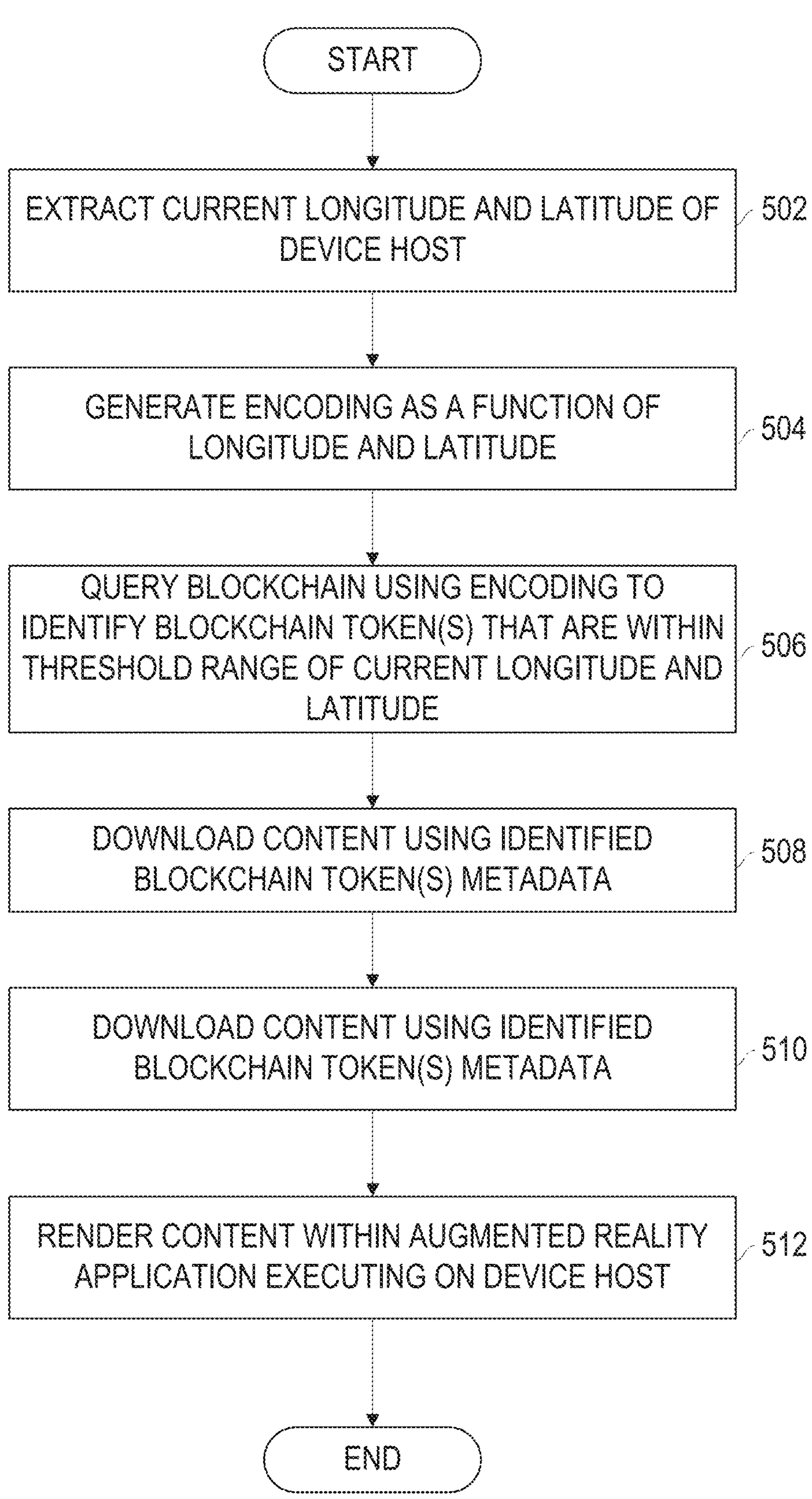
FIG. 5 illustrates an example set of operations for managing a transaction flow within a blockchain network in accordance with some embodiments.

FIG. 5 illustrates an example set of operations for managing a transaction flow within a blockchain network in accordance with some embodiments. One or more of the steps may be omitted, repeated, and/or performed in a different order. Accordingly, the specific arrangement of steps shown in FIG. 5 should not be construed as limiting the scope of the embodiments.

In some embodiments, a client application (e.g., an AR or VR application) extracts current latitude and longitude coordinates of the device host (operation 502). As previously mentioned, geographical coordinates may be extracted using one or more device sensors, such as reading the GPS coordinates from a GPS receiver or triangulating the user's position based on cellular or Wi-Fi signals received by the device hardware.

In some embodiments, the client application generates an encoding as a function of the longitude and latitude extracted from the device host (operation 504). The encoding may follow the format depicted in Table 1. The latitude and longitude values may be rounded to a threshold level of decimal precision when generating the encoding. In other cases, this operation may be performed by blockchain network 110, and the client application's query may include the latitude and longitude values extracted from the device host. Also, as mentioned previously, while the examples herein use latitude and longitude coordinates, other coordinates systems may be used to generate the location encodings and perform content retrieval operations.

In some embodiments, the client application queries the blockchain using the encoding to identify blockchain tokens with matching token IDs or with token IDs that are within a threshold range of the current device position (operation 506). In some cases, the query may request an exact match. If one is not detected, then the blockchain token with the closest token ID may be identified and returned. In other cases, the query may request tokens within a threshold distance of the current device's position. The distance may be computed based on a comparison of the blockchain token ID and the encoding generated as a function of the device's current location. Blockchain network 110 may then return all NFT tokens within the threshold distance. The query may further specify additional filter criteria for location-based NFT tokens. For example, the query may request only tokens associated with a particular owner. Blockchain token 110 may filter out tokens that do not match the criteria, returning only those tokens that satisfy the query requirements.

In some embodiments, blockchain network 110 returns the token URI(s) and/or other token metadata of the matching blockchain token(s) (operation 508). For example, a peer node may return an IPFS URL stored with token URI field 144 on the distributed ledger. The peer node may verify if the token URI is active before it is returned to the client application. A token URI may become inactive if the ownership has changed and the new owner has replaced the URI with a new link. In other cases, the new owner may deactivate the link for other reasons.

Upon receiving the response, the client application downloads the content using the token URI and/or other token metadata (operation 510). For example, the application may query the IPFS network for the content located using the IPFS link. As previously noted, the content may include multimedia files, executable code, and/or other types of files, which may be curated by the token owner or renter.

In some embodiments, the client application renders the content within an AR or VR interface on the device host (operation 512). For example, the client application may display an image, play a video, initiate an audio clip, and/or execute code populating the geographic space. In some cases, the application may render the content as a function of the device's current position relative to the content's position. The relative position may be determined based on a comparison of the token ID and the encoding generated from the device's current coordinates. The relative position may be used to determine the size, distance, angle, direction of movement, sound volume and/or other render attributes of the content. In other cases, the content may be rendered without computing the relative position. In these scenarios, the location-based encoding of the devices current coordinates may be resolved to the content populating the geographic space.

As previously noted, multiple content layers may be assignable in a single metadata definition, allowing a physical space to have multi-dimensionality in the system. For example, the application may initiate playback of an audio file while presenting an image when the device host occupies the physical space. In other cases, the set of content that is accessed and rendered at the physical space may vary depending on the client application that is executing on the device host. An AR gaming application may access one set of files stored in the space, while an educational application may access a different set of files. The client application may determine which content to access based on the token metadata, which may define the dimensional attributes associated with each content layer.

5. Computer Networks and Cloud Networks

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In some embodiments, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an API.

In some embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In some embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In some embodiments, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In some embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In some embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In some embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Computing Device Hardware Implementations

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
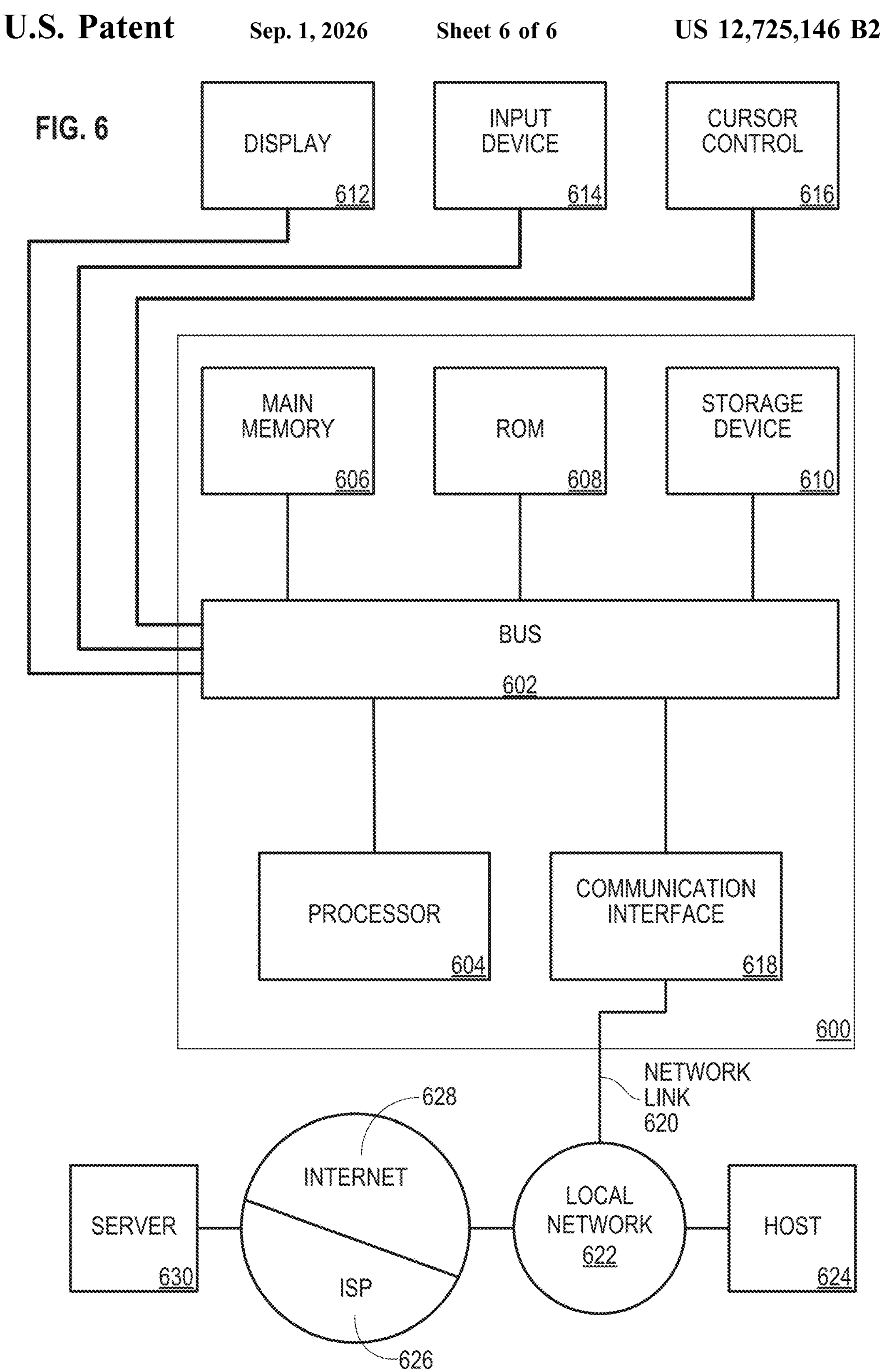
FIG. 6 shows a block diagram that illustrates a computer system in accordance with some embodiments.

For example, FIG. 6 is a block diagram that illustrates computer system 600 upon which some embodiments may be implemented. Computer system 600 includes bus 602 and/or one or more other communication mechanisms for transferring data between system components. Computer system 600 also includes hardware processor 604 coupled with bus 602 for processing information. Hardware processor 604 may be, for example, a general-purpose microprocessor.

Computer system 600 further includes main memory 606, such as random-access memory (RAM) and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 and/or other static storage device coupled to bus 602 for storing static information and instructions for processor 604. Storage device 610, such as a magnetic disk or optical disk, is provided and coupled to bus 602 for storing information and instructions.

Computer system 600 may be coupled via bus 602 to display 612, such as a cathode ray tube (CRT) or light-emitting diode (LED) screen, for displaying information to a computer user. Input device 614, including alphanumeric and other keys, is coupled to bus 602 for communicating information and command selections to processor 604. Another type of user input device is cursor control 616, such as a touchscreen, mouse, a trackball, or cursor direction keys for communicating direction information and command selections to processor 604 and for controlling cursor movement on display 612. This input device may have two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes communication interface 618 coupled to bus 602. Communication interface 618 provides a two-way data communication coupling to network link 620 that is connected to local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to host computer 624 or to data equipment operated by Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

9. Miscellaneous; Extensions

Embodiments are directed to a system with one or more devices that include a hardware processor and that are configured to perform any of the operations described herein and/or recited in any of the claims below.

In some embodiments, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions which, when executed by one or more hardware processors, cause:

receiving a request to generate a nonfungible token (NFT), within a blockchain network, the request specifying a set of geographic coordinate values;

responsive to receiving the request, generating, by chaincode executing in the blockchain network, a unique token identifier, for the NFT, that encodes the set of geographic coordinates associated with a particular geographic space, wherein a first component of the unique token identifier distinguishes location-encoded NFTs from non-location-encoded NFTs within the blockchain network and indicates that the NFT is location-encoded, wherein a second set of one or more components of the unique token identifier identifies latitudinal and longitudinal coordinates to a threshold level of precision used for identifier comparison;

recording the unique token identifier on a distributed ledger of the blockchain network, wherein the blockchain network enforces uniqueness of the unique token identifier for the encoded coordinate values during a ledger commit;

storing, in association with the NFT for the particular geographic space, a set of content, wherein the set of content is accessible by applications connected to the blockchain network when executed within the particular geographic space; and accessing the NFT responsive to the blockchain network receiving location data associated with a device, wherein an application on the device executes one or more operations based on the set of content associated with the NFT.

2. The media of claim 1, wherein the blockchain network enforces a consensus protocol that restricts available unique token identifiers based at least in part on geographic coordinates of physical spaces.

3. The media of claim 2, wherein the consensus protocol restricts the unique token identifiers to encode geographic coordinates that correspond to locations on Earth.

4. The media of claim 2, wherein the consensus protocol restricts the unique token identifiers to encode geographic coordinates that correspond to a predefined geographic region.

5. The media of claim 1, wherein a geographic area covered by the NFT is determined based at least in part on the threshold level of precision.

6. The media of claim 1, wherein the second set of one or more components includes a prefix component that indicates whether the latitudinal and longitudinal coordinates are positive or negative.

7. The media of claim 1, wherein the instructions further cause:

associating the NFT with a digital wallet address associated with an owner of the NFT; wherein the blockchain network permits the owner to populate metadata associated with the NFT with curated content.

8. The media of claim 7, wherein the instructions further cause:

receiving a request, digitally signed using a private key of the digital wallet address associated with the owner of the NFT, to write a link to the distributed ledger; wherein the link includes a reference to the curated content at an off-chain decentralized network.

9. The media of claim 7, wherein the instructions further cause:

executing a program in the blockchain network that rents the NFT to another user; wherein the program associates the NFT with a second digital wallet address and provides access to the second digital wallet address to update a uniform resource identifier associated with the NFT.

10. The media of claim 1, wherein the NFT is generated by minting chaincode executed by one or more peer nodes in the blockchain network.

11. The media of claim 1, wherein the instructions further cause:

generating an encoding based at least in part on a set of geographic coordinates of a host device executing a blockchain connected application; identifying a particular blockchain token that has a unique token identifier matching the encoding; and returning a link associated with the particular blockchain token to a blockchain-connected application executing on the host device, wherein the blockchain-connected application downloads a set of content using the link.

12. The media of claim 11, wherein the encoding is generated by the blockchain-connected application.

13. The media of claim 11, wherein the encoding is generated by a node in the blockchain network responsive to receiving a query from the blockchain-connected application that includes the geographic coordinates of the host device.

14. The media of claim 1, wherein the instructions further cause:

generating an encoding based at least in part on a set of geographic coordinates of a host device executing a blockchain connected application; identifying a set of blockchain tokens that have token identifiers within a threshold distance of the encoding; and returning, to a blockchain-connected application executing on the host device, a set of links to content associated with the set of blockchain tokens that have token identifiers within the threshold distance of the encoding.

15. The media of claim 14, wherein the blockchain-connected application renders at least one set of content referenced by at least one link associated with a particular blockchain token based at least in part on a relative position that is determined as a function of the encoding and a token identifier of the particular blockchain token.

16. A system comprising:

one or more hardware processors; and one or more non-transitory computer-readable media storing instructions which, when executed by the one or more hardware processors, cause:

receiving a request to generate a nonfungible token (NFT), within a blockchain network, the request specifying a set of geographic coordinate values;

responsive to receiving the request, generating, by chaincode executing in the blockchain network, a unique token identifier, for the NFT, that encodes the set of geographic coordinates associated with a particular geographic space, wherein a first component of the unique token identifier distinguishes location-encoded NFTs from non-location-encoded NFTs within the blockchain network and indicates that the NFT is location-encoded, wherein a second set of one or more components of the unique token identifier identifies latitudinal and longitudinal coordinates to a threshold level of precision used for identifier comparison;

recording the unique token identifier on a distributed ledger of the blockchain network, wherein the blockchain network enforces uniqueness of the unique token identifier for the encoded coordinate values during a ledger commit;

storing, in association with the NFT for the particular geographic space, a set of content, wherein the set of content is accessible by applications connected to the blockchain network when executed within the particular geographic space; and accessing the NFT responsive to the blockchain network receiving location data associated with a device, wherein an application on the device executes one or more operations based on the set of content associated with the NFT.

17. A method comprising:

receiving a request to generate a nonfungible token (NFT), within a blockchain network, the request specifying a set of geographic coordinate values;

responsive to receiving the request, generating, by chaincode executing in the blockchain network, a unique token identifier, for the NFT, that encodes the set of geographic coordinates associated with a particular geographic space, wherein a first component of the unique token identifier distinguishes location-encoded NFTs from non-location-encoded NFTs within the blockchain network and indicates that the NFT is location-encoded, wherein a second set of one or more components of the unique token identifier identifies latitudinal and longitudinal coordinates to a threshold level of precision used for identifier comparison;

recording the unique token identifier on a distributed ledger of the blockchain network, wherein the blockchain network enforces uniqueness of the unique token identifier for the encoded coordinate values during a ledger commit;

storing, in association with the NFT for the particular geographic space, a set of content, wherein the set of content is accessible by applications connected to the blockchain network when executed within the particular geographic space; and accessing the NFT responsive to the blockchain network receiving location data associated with a device, wherein an application on the device executes one or more operations based on the set of content associated with the NFT.

18. The method of claim 17, wherein the blockchain network enforces a consensus protocol that restricts available unique token identifiers based at least in part on geographic coordinates of physical spaces.

19. The method of claim 18, wherein the consensus protocol restricts the unique token identifiers to encode geographic coordinates that correspond to locations on Earth.

20. The method of claim 18, wherein the consensus protocol restricts the unique token identifiers to encode geographic coordinates that correspond to a predefined geographic region.

* * * * *